United States Patent [19]

Ito et al.

[11] Patent Number: 4,702,307

[45] Date of Patent: Oct. 27, 1987

[54] AIR CONDITIONER CONTROL SYSTEM

[75] Inventors: Akinori Ito; Michitada Akazawa; Shiro Kondo, all of Furukawa, Japan

[73] Assignee: Alps Electric Co., Ltd., Japan

[21] Appl. No.: 940,514

[22] Filed: Dec. 10, 1986

[30] Foreign Application Priority Data

Jan. 23, 1986 [JP] Japan .................................. 61-11176

[51] Int. Cl.$^4$ .............................................. B60H 3/00
[52] U.S. Cl. ................................. 165/42; 237/12.3 R; 237/12.3 A; 62/239
[58] Field of Search ..................... 237/12.3 R, 12.3 A, 237/12.3 B; 62/239, 244, 243; 165/41, 42; 98/2, 2.06, 2.08, 2.11; 236/13

[56] References Cited

U.S. PATENT DOCUMENTS 4,420,115  12/1983  Matsushima et al. ......... 237/12.3 A Primary Examiner—Henry A. Bennet
Attorney, Agent, or Firm—Guy W. Shoup

[57] ABSTRACT

An air conditioner control system for adjusting the mixing ratio of warm and cool winds by controlling the opening angle of the air mixing door of an air conditioner. The control system includes a base board formed with for wiring patterns and a contact lever made swingable on a common point shared with the base board and carrying a pair of sliding contacts for sliding into selective contact with the wiring patterns. The contact lever is adapted to engage with a control knob, and the base board is connected to a motor actuator. The air mixing door is opened or closed in accordance with the movement of the control knob so that the base board may accordingly be swung in the lever moving direction.

9 Claims, 16 Drawing Figures

AIR CONDITIONER CONTROL SYSTEM

BACKGROUND OF THE INVENTION

1. Field of the Invention

The present invention relates to an air conditioner control system installed on an automobile and, more particularly, to an air conditioner control system which is enabled to set a desired temperature by changing the open angle of an air mixing door.

2. Description of the Prior Art

Before entering into the detailed description of the present invention, cursory review of the prior art will be made in the following with reference to the accompanying drawings.

FIG. 4 is a schematic diagram for explaining an ordinary air conditioner which is installed on an automobile.

As shown in FIG. 4, the air conditioner is equipped therein with a variety of doors having different functions. At first, the internal and external air change is undergone by means of an intake door 12 for selectively sucking the air from the inside or outside of the car compartment into the air conditioner. The air having passed through that intake door 12 is fed by the action of a fan motor 13 to an evaporator 14. This evaporator 14 functions to forcibly cool and send out the air fed. Then, the air having passed through the evaporator 14 is separated into one to be used as a cool wind without any treatment and the other to be heated by a heater core 15 so that it may be used as a warm wind until the cool air and the warm air are later mixed to prepare a wind at a suitable temperature. In order to determine the mixing ratio of those cool and warm winds, moreover, there is provided an air mixing door 11. In dependence upon the opening degree of this air mixing door 11, the desirably air-conditioned wind can accordingly be prepared. The wind thus prepared is then fed to a ventilation door 17, a floor door 18 and a defrost door 19 so that the respective air exits are selected in dependence upon the opening states of those doors 17, 18 and 19 to feed the properly air-conditioned wind from the exit selected.

As has been described above, the automotive air conditioner is equipped with the various doors, of which the intake door 12, the ventilation door 17, the floor door 18 and the defrost door 19 may be selectively opened or closed whereas exclusively the air mixing door 11 has to be continuously opened and closed because it is required to have a variety of opening states.

FIG. 5 is a perspective view showing an example of the drive mechanism for driving the air mixing door according to the prior art. In FIG. 5, reference numeral 20 denotes an L-shaped lever, and numeral 21 denotes a wire.

As shown in the same Figure, the lever 20 is hinged at a pin 20b so that it can swing in the directions of arrows A—A, whereas the air mixing door 11 is hinged at pins 11a so that it can swing in the directions of arrows B—B. The wire 21 is connected between one end 20c of the lever 20 and the air mixing door 11. If a control knob 20a fitted on the other end of the lever 20 is manually moved in the directions of the arrows A—A, these motions can accordingly be transmitted through the wire 21 to the air mixing door 11 to rotate this door 11 at a desired angle in the directions of the arrows B—B in accordance with the motions of the lever 20.

In the drive mechanism of this manual type, however, the air mixing door 11 is driven by the actuation of the lever 20 so that the manual force required is high. Especially during the ventilation, the air mixing door 11 is subjected to the wind pressure so that the lever 20 has to be actuated by a higher manual force to raise a defect that the lever 20 becomes difficult to actuate.

In order to eliminate this defect concomitant with the manual type drive mechanism, therefore, we have proposed an electric drive mechanism for opening and closing the air mixing door by the driving force of a motor.

FIGS. 6, 7 and 8 are a perspective view and diagrams showing the air conditioner control system proposed previously and for explaining the changing operations of a toggle switch attached to said system.

In FIG. 6, reference numeral 1 denotes a control knob which is adapted to be linearly moved thereby to change the temperature. And, this control knob 1 is fixedly fitted on a projection 3a of a toggle switch 3 through a front panel 2 which is graduated in temperatures or the like. As a result, the control knob 1 and the toggle switch 3 are associated with each other.

Denoted at numeral 4 is a case which cases the aforementioned toggle switch 3 and a later-described cam follower 5. This case 4 is formed with guide grooves 4a and 4b for linearly moving those toggle switch 3 and cam follower 5.

At the end opposed to the projection 3a, on the other hand, the toggle switch 3 carries a change lever 3b. The cam follower 5 is formed with a generally V-shaped notch 5a which can engage with and disengage from that change lever 3b. With the toggle switch 3, moreover, there is connected through cords 6 a motor 7 which is so wired that it is interrupted and turned forward and backward by the changing operations of the change lever 3b.

These wiring connections will be described in detail with reference to FIGS. 7(a), 7(b) and 7(c). In case the aforementioned toggle switch 3 faces the cam follower 5 to have its change lever 3b engaging with the notch 5a, it is in its OFF position, in which no power is supplied to interrupt the motor 7, as seen from the circuit diagram of FIG. 7(a).

In case the toggle switch 3 is moved from this state rightwardly of the drawing so that the change lever 3b is brought down leftwardly of the drawing by the notch 5a, as shown in FIG. 7(b), the motor 7 is energized to turn forward (i.e., clockwise of the drawing).

In case, on the contrary, the toggle switch 3 is moved leftwardly of the drawing so that the change lever 3b is brought down rightwardly of the drawing by the notch 5a, as shown in FIG. 7(c), the current flows in the reverse direction to that of the case of FIG. 7(b) so that the motor 7 is energized to turn backward (i.e., counterclockwise of the drawing).

Reverting to FIG. 6, there is fixed to the shaft 7a of the motor 7 a planar actuator 8 to which are connected one end of a feedback wire 9 and one end of a wire 10. The other end of the feedback wire 9 is connected to the aforementioned cam follower 5 whereas the other end of the wire 10 is connected to a substantially central portion of one end face of the air mixing door 11. In the two end faces of the lower portion of that air mixing door 11, moreover, there are anchored the pins 11a which provide the fulcrum when the door 11 is to be opened and closed.

Next, the operations of the air conditioner control system thus constructed will be described mainly with reference to FIG. 8.

FIG. 8(a) shows the stopped state of the air mixing door 11. Since, in this state, the change lever 3b of the toggle switch 3 and the notch 5a of the cam follower 5 are in engagement with each other, the toggle switch 3 is in its OFF state so that the motor 7 is interrupted to leave the air mixing door 11 in the upright position.

If the control knob 1 is manually actuated from this state to move the toggle switch 3 rightwardly of the drawing, the change lever 3b is brought down leftward, as shown in FIG. 8(b), so that the motor 7 undergoes the rotational drive in the clockwise direction. As a result, the actuator 8 fixed on the shaft 7a is turned clockwise to pull the cam follower 5 connected to said actuator 8 through the feedback wire 9, rightwardly of the drawing. When the cam follower 5 is moved to face the toggle switch 3, the change lever 3b restores its engagement with the notch 5a so that the motor 7 also restores its interrupted state. In this meanwhile, the air mixing door 11 is pushed rightward in association with the movement of the aforementioned cam follower 5 because it is connected through the wire 10 to the aforementioned actuator 8. As a result, the air mixing door 11 is brought down rightward on its pins 11a, as shown in FIG. 8(c).

If the control knob 1 is then actuated from this state leftward to move the toggle switch 3 leftward from the state of FIG. 8(a), the change lever 3b is brought down rightward, as shown in FIG. 8(d), so that the motor 7 undergoes its rotational drive in the counter-clockwise direction. As a result, the actuator 8 is turned counter-clockwise so that the cam follower 5 is pushed leftwardly of the drawing through the feedback wire 9 until it comes to face the toggle switch 3. When the change lever 3b comes into engagement with the notch 5a, the motor 7 comes into its interrupted state. Since the air mixing door 11 is also pulled at this time leftwardly of the drawing by the wire 10 in association with the movement of the cam follower 5, it is brought down to the left on its pins 11a, as shown in FIG. 8(e).

With the construction thus far described, when the change switch is slid a predetermined stroke by the control knob to energize the motor, this motor can be interrupted by causing the cam follower to follow the change switch a stroke according to the sliding stroke. As a result, the opening angle of the air mixing door can be controlled not manually but electrically in a fine manner in accordance with the movement of the control knob to set the temperature accurately.

However, the air conditioner control systems of the prior art are troubled by the facts that they are complicated to require a wide space for accommodation and that they are limited in their installations.

SUMMARY OF THE INVENTION

It is, therefore, an object of the present invention to provide an air conditioner control system which is easy to install and requires less space than prior art systems.

According to the present invention, there is provided an air conditioner control system for adjusting the mixing ratio of warm and cool winds by controlling the opening angle of the air mixing door of an air conditioner, comprising: a power supply having positive and negative terminals; a control knob made manually movable; a base board formed thereon with a plurality of wiring concentric patterns, two of which are connected with the positive and negative terminals of said power supply, said base board being made swingable on the common center of said wiring patterns; a pair of sliding contacts made turnable on said common center in association with the movement of said control knob for selectively contacting with said wiring patterns; a prime mover for turning backward and forward and stopping in accordance with the contacting states between said wiring patterns and said sliding contacts; and connecting means for providing connections between said prime mover and the air mixing door of said air conditioner and between said prime mover and said base board, wherein the improvement resides in that said prime mover stops said base board, when said sliding contacts are located on the polarity changing point of said wiring patterns, and turns said base board to bring said sliding contacts into said polarity changing point when said sliding contacts are apart from said polarity changing point.

In order to achieve the above-specified object of the present invention, the air conditioner control system includes a base board formed with wiring patterns and a contact lever made swingable on a common point shared with the base board and carrying a pair of sliding contacts for sliding into selective contact with the wiring patterns. The contact lever is adapted to engage with a control knob, and the base board is connected to a motor actuator. The air mixing door is opened or closed in accordance with the movement of the control knob so that the base board may accordingly be swung in the lever moving direction.

With the technical means described above, when the control knob is slid a predetermined stroke so as to set the temperature, the sliding contacts having been located in their neutral positions are manually brought to supply the motor with a positive or negative polarity so that the motor turns in the direction according to the power supplied. As the motor turns, the air mixing door is opened or closed, and at the same time the base board is swung to follow the sliding contacts having slid. This turn of the motor continues until the sliding contacts come to the center of the base board. When this state is invited, the power supply to the motor is interrupted to stop the air mixing door. As a result, the opening angle of the air mixing door can be finely controlled with a stroke corresponding to the movement of the cam follower following the change switch, i.e., to the slide of the control knob.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENT

The present invention will be described in the following in connection with the embodiment thereof with reference to the accompanying drawings.

Figure 1:
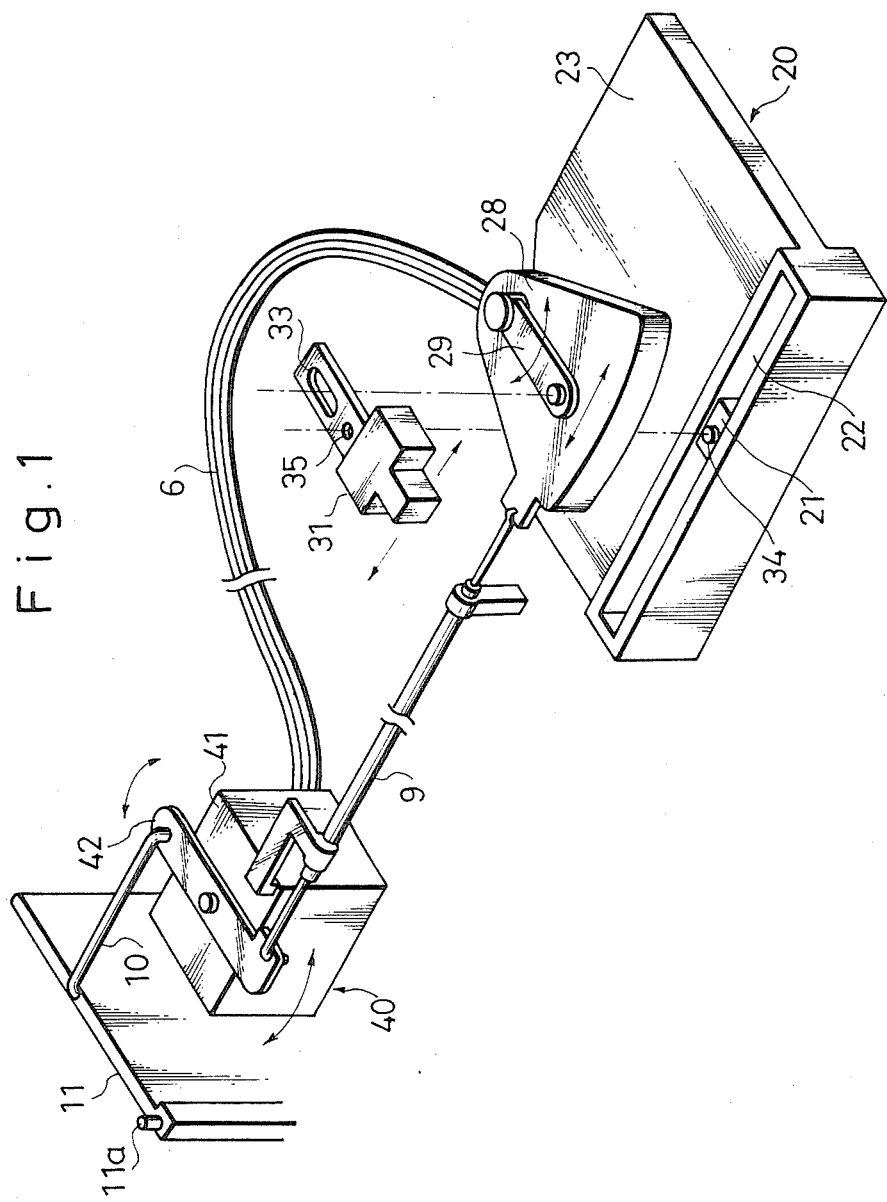
FIG. 1 is an exploded perspective view showing an air conditioner control system according to the present invention.
Figure 2:
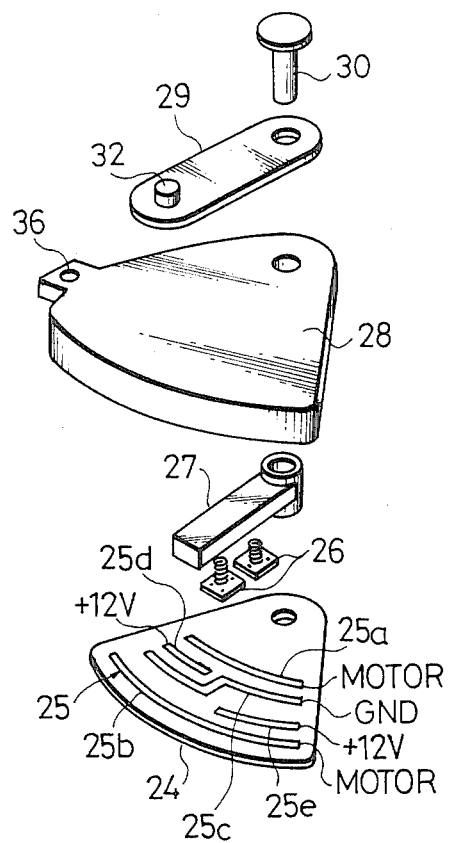
FIG. 2 is an exploded perspective view showing the base board and sliding contacts of the control system of FIG. 1 in an enlarged scale.

FIG. 1 is an exploded perspective view showing an air conditioner control system according to the present invention, and FIG. 2 is an exploded perspective view showing the base board and sliding contacts of the control system of FIG. 1 in an enlarged scale.

In FIGS. 1 and 2, the air conditioner is constructed majorly of an operation/control unit 20 and a drive unit 40, which are connected with each other by means of cords 6 and a wire 9. The operation/control unit 20 is composed of: a sliding member 21; a guide groove 22 for guiding the sliding member 21 freely in horizontal directions; a bed 23 formed with the guide groove 22 at its one end; a base board 24 hinged on the bed 23 and formed with wiring patterns 25 providing a change switch; a pair of sliding contacts 26 made slidable on the wiring patterns; a contact lever 27 carrying the sliding contacts 26 and having a hinged one end; a cover 28 protecting the lever 27 and the base board 24; a connecting lever 29 arranged over the upper surface of the cover 28 and made swingable integrally with the contact lever 27; a pin 30 connecting the levers 27 and 29 to each other and fitting the base board 24 and the cover 28 loosely thereon; and a control knob 31 which has at its one end a slot 33 receiving a pin 32 anchored at an end portion of the lever 29 and at its other end an actuation portion and a hole 35 receiving a pin 34 anchored at the head of the sliding member 21. Incidentally, reference numeral 36 denotes a hole hooking the wire 9 therein.

The wiring patterns 25 of the base board 24 are composed of four concentric ridges, as better seen from FIG. 2. Of the intermediate two, one ridge is formed generally in the shape of letter "S" whereas another is divided into two discontinuous sub-ridges extending along the inner and outer lines of the former S-shaped ridge. For these wiring patterns 25, the sliding contacts are juxtaposed to each other, of which one is arranged to short the inner two ridges whereas the other is arranged to short the outer two ridges.

As to the connections of the power supply and a motor 41 with the wiring patterns 25, as indicated in FIG. 2, the motor 41 is connected with the innermost and outermost patterns 25a and 25b. The power supply is connected with the intermediate two ridges such that its has its negative (or ground) terminal connected with the stepped (or S-shaped) pattern 25c and its positive terminal connected with the discontinuous patterns 25d and 25e.

On the other hand, the drive unit 40 is composed of: the motor 41 adapted to be supplied with the power through the cords 6 connected with the wiring patterns 25; and an actuator 42 having its central portion fixed on the shaft of the motor 41, its one end connected to the feedback wire 9 and its other end connected to the wire 10. The motor 41 is of DC type so that it can turn forward or backward in accordance with the polarity of the power supplied. Thus, the air mixing door 11 and the cover 28 (and accordingly the base board 24) are swung by the turns of the motor 41.

Figure 3A:
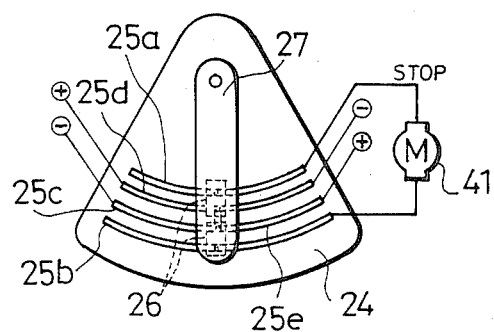
FIGS. 3(a), 3(i b) and 3(c) are top plan views of the base board and the sliding contacts of FIG. 2 for explaining the operations of the present invention.

The operations of the control system thus constructed will be described in the following with reference to FIGS. 3(a), 3(b) and 3(c). Of these, FIG. 3(a9 shows the state in which the air mixing door 11 is stopped. In this stop state, the sliding contacts 26 are located at the center of the base board 24, i.e., in the stepped pattern so that the patterns 25a and 25b are connected together through the sliding contacts 26 with the negative terminal of the power supply. This supplies no power to the terminal of the motor 41.

Figure 3B:
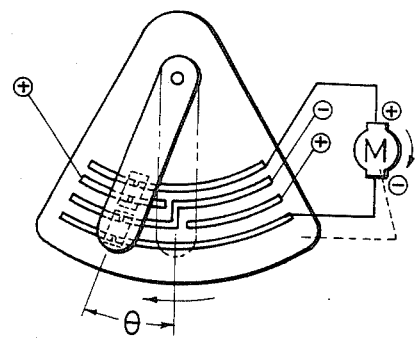

If the control knob 31 is manually turned from this state by an angle θ leftwardly of FIG. 1, the contact lever 27 is turned clockwise, as shown in FIG. 3(b). In this state, the patterns 25a and 25d and the patterns 25b and 25c are connected by the paired sliding contacts 26. As a result, the motor 41 is supplied with the positive voltage through the pattern 25a while the pattern 25 being earthed so that it starts to turn forward (i.e., in the clockwise direction of FIG. 1). In accordance with this turn, the actuator 42 is turned to pull the wires 9 and 10 thereby to turn the door 11 clockwise. If the base board 24 is swung by the same angle as that θ of the lever 27 in accordance with the turn of the motor 41, the state of FIG. 3(a) is restored. As a result, the power supply to the motor 41 is interrupted so that the motor 41 is stopped to leave the door 11 open with a certain opening degree.

Figure 3C:
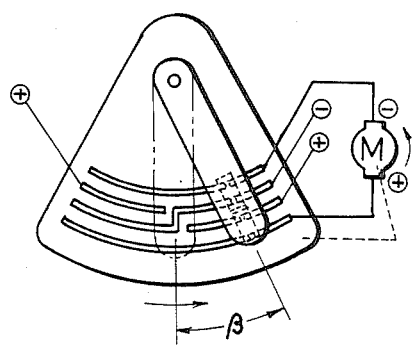
Figure 4:
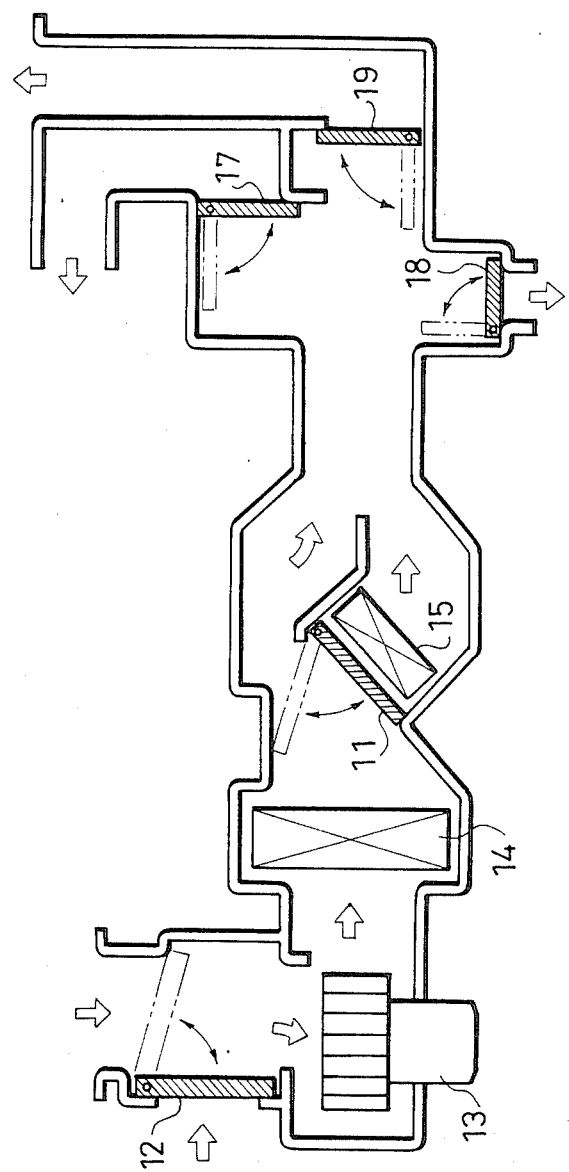
FIG. 4 is a schematic section showing the existing automotive air conditioner.
Figure 5:
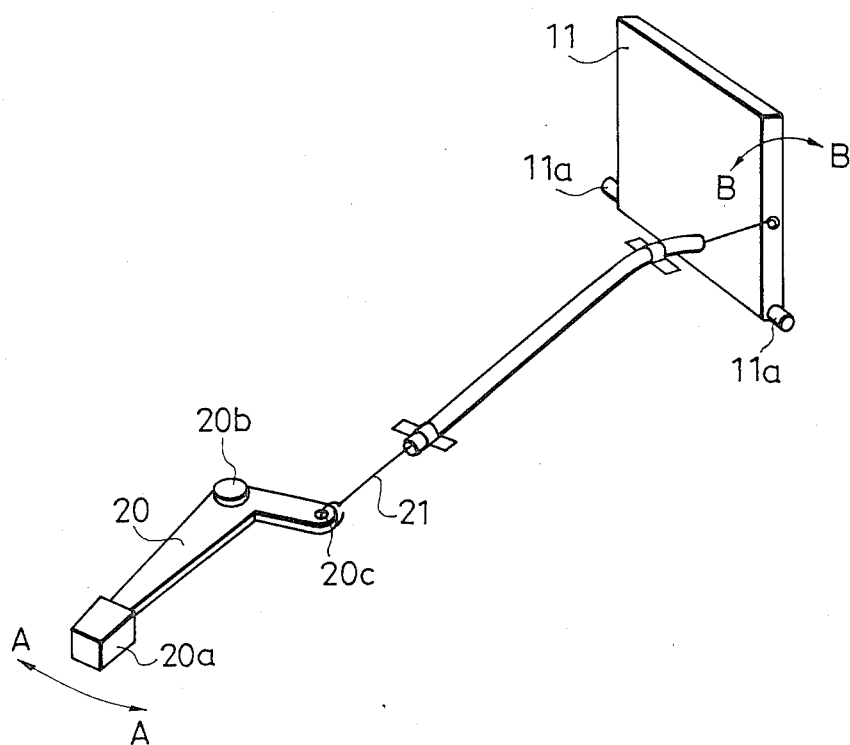
FIG. 5 is a perspective view showing the air conditioner control system of manual type according to the prior art.
Figure 6:
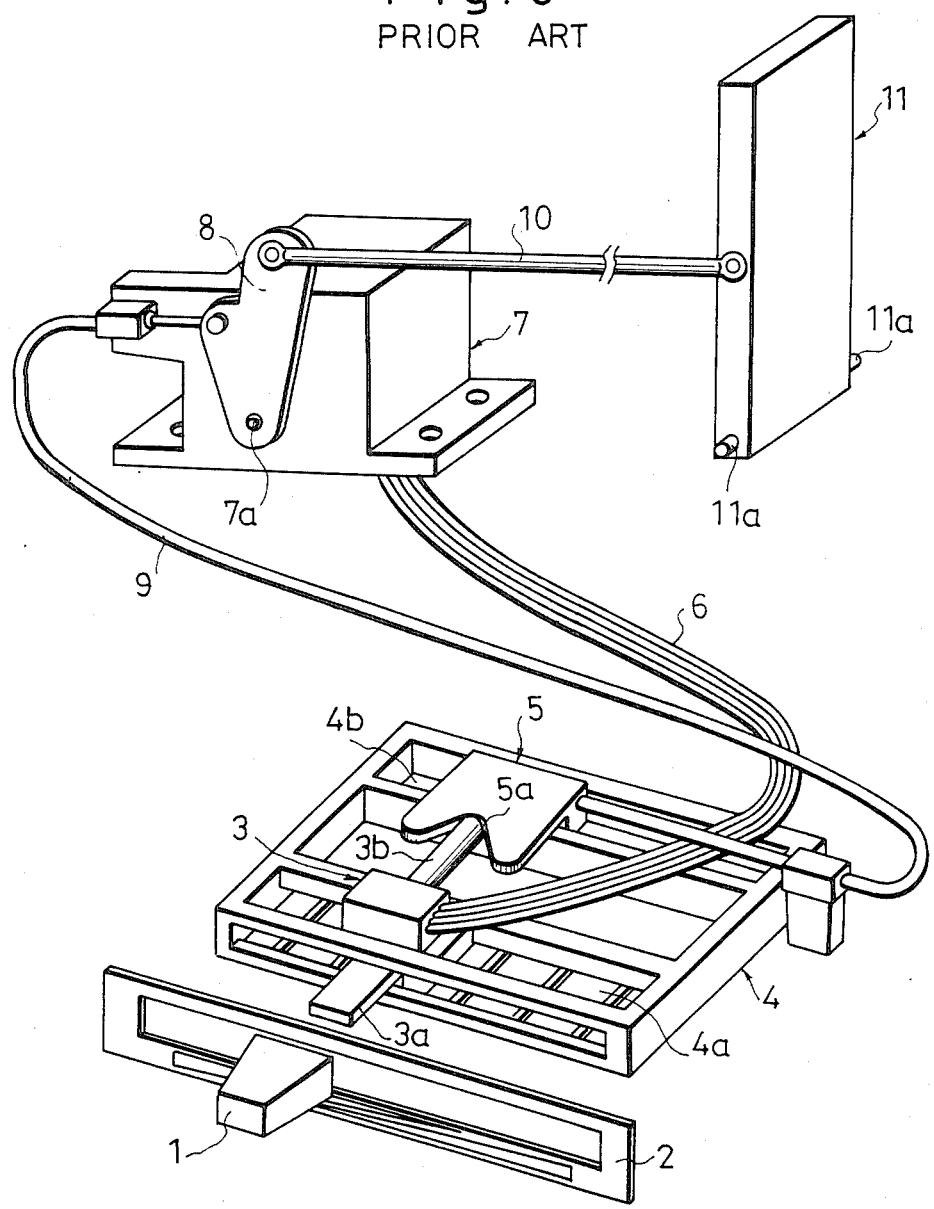
FIG. 6 is a perspective view showing the air conditioner control system of electric type according to the prior art.
Figure 7A:
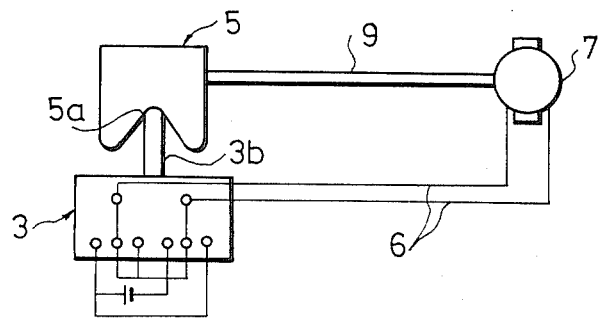
FIGS. 7(a), 7(b) and 7(c) are wiring diagrams showing the circuits among the motor, toggle switch and power supply of the air conditioner control system of FIG. 6.
Figure 7B:
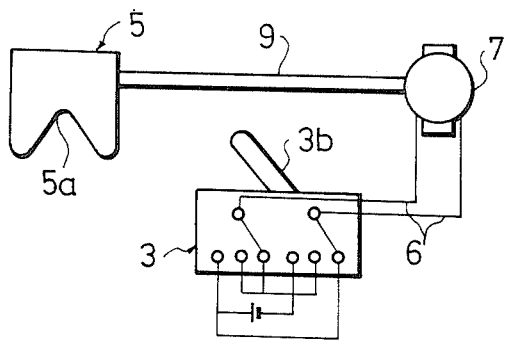
Figure 7C:
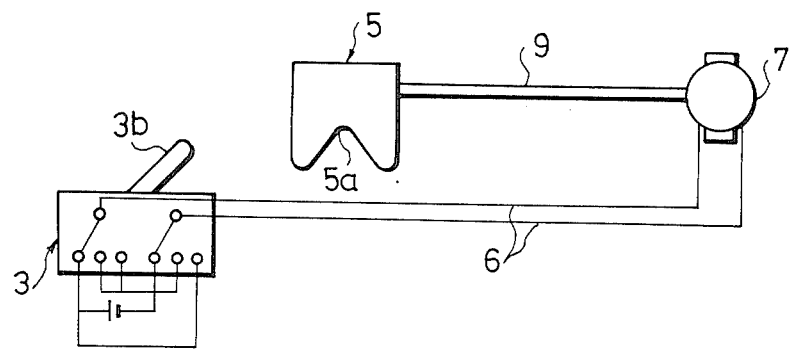
Figure 8A:
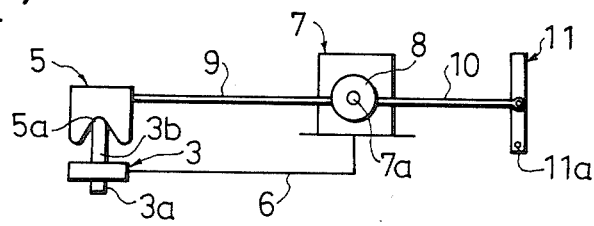
FIGS. 8(a) to 8(e) are schematic diagrams for explaining the operations of the air conditioner control system of FIG. 6.
Figure 8B:
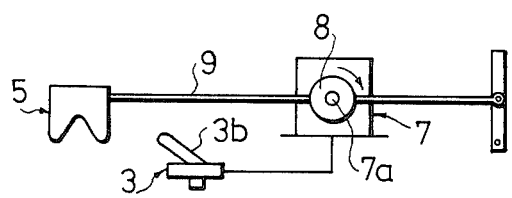
Figure 8C:
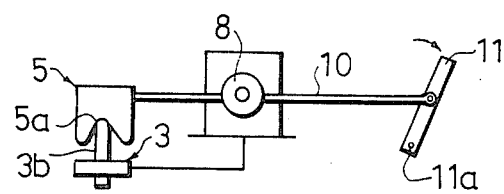
Figure 8D:
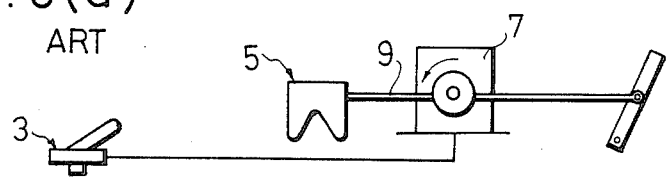
Figure 8E:
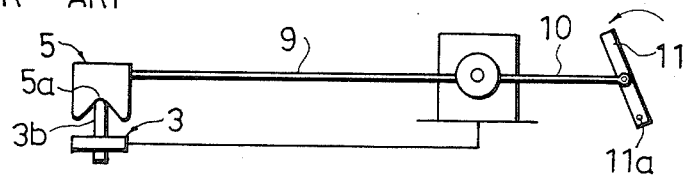

If the control knob 31 is turned by an angle β in the reverse direction to the aforementioned one, i.e., rightwardly of FIG. 3(c) the wiring patterns are so connected as to reverse the turn of the motor 41. As a result, the motor 41 is turned counter-clockwise to push the wires 9 and 10 thereby to swing the door 11 and the base board 24. If the base board 24 is swung by the angle β, the state of FIG. 3(a) is also restored to interrupt the power supply and stop the turn of the motor 41.

As has been described hereinbefore, by moving the movable (or sliding) contacts connected to the control knob 31, the motor can be started in the turning direction corresponding to the moving direction of the contacts. At the same time, by giving the fixed contacts (i.e., the wiring patterns on the base board) the feedback corresponding to those movements, the motor can be stopped. Thus, the temperature can be set reliably and easily. Since the cam follower indispensable for the prior art can be omitted, moreover, it is possible to provide an air conditioner control system of small-sized and simplified construction.

Incidentally, the contact lever and the control knob may be integrated although they are made separate in the embodiment thus far described.

Moreover, the cover 28 is provided for preventing the dust carried by the ventilation air in the duct from being deposited on the base board thereby to eliminate any inferior insulation. This makes it unnecessary to provide the cover 28 unless such anxiety is present. Still moreover, the lever 29 can be omitted to connect the lever 27 and the control knob 31.

As has been described hereinbefore, according to the present invention, it is possible to provide an air conditioner control system which can have its size reduced by the simple construction and can be easily installed without any mounting restriction.

What is claimed is:

1. An air conditioner control system for adjusting the mixing ratio of warm and cool winds by controlling the opening angle of the air mixing door of an air conditioner, comprising:
    a power supply having positive and negative terminals;
    a control knob made manually movable;
    a base board formed thereon with a plurality of wiring concentric patterns, two of which are connected with the positive and negative terminals of said power supply, said base board being made swingable on the common center of said wiring patterns;
    a pair of sliding contacts made turnable on said common center in association with the movement of said control knob for selectively contacting with said wiring patterns;
    a prime mover for turning backward and forward and stopping in accordance with the contacting states between said wiring patterns and said sliding contacts; and
    connecting means for providing connections between said prime mover and the air mixing door of said air conditioner and between said prime mover and said base board,
    wherein the improvement resides in that said prime mover stops said base board, when said sliding contacts are located on the polarity changing point of said wiring patterns, and turns said base board to bring said sliding contacts into said polarity changing point when said sliding contacts are apart from said polarity changing point.

2. An air conditioner control system according to claim 1, wherein said prime mover includes a DC motor.

3. An air conditioner control system according to claim 2, wherein said connecting means includes:
    door swinging means for swinging said air mixing door when said DC motor turns, said door swinging means including an actuator having its central portion fixed on the shaft of said DC motor, and a first wire connecting said air mixing door and one end of said actuator; and
    board swinging means for swinging said base board relative to said sliding contacts when said DC motor turns forward, said board swinging means including a second wire connecting the other end of said actuator and said base board.

4. An air conditioner control system according to claim 3, wherein the second-named wire is adapted to connect said actuator and said base board directly.

5. An air conditioner control system according to claim 3, further comprising a board cover covering said base board.

6. An air conditioner control system according to claim 5, wherein the second-named wire is adapted to connect said actuator and said base board indirectly through said board cover.

7. An air conditioner control system according to claim 5, further comprising: a contact lever carrying said sliding contacts and having one hinged end; and a connecting lever arranged over said board cover and made swingable together with said contact lever for connecting said control knob and said contact lever through said connecting lever.

8. An air conditioner control system according to claim 1, wherein said sliding contacts include four concentric ridges, of which an intermediate one is stepped into the form of letter "S" and the other intermediate one is divided into two discontinuous subridges extending along the inner and outer lines of said stepped intermediate ridge.

9. An air conditioner control system according to claim 8, wherein said sliding contacts are juxtaposed to each other such that one is arranged to short the inner two of said four ridges whereas the other is arranged to short the outer two of the same.

* * * * *